United States Patent [19]
Menough et al.

[11] 3,837,387
[45] Sept. 24, 1974

[54] BREAKER BANDS FOR PNEUMATIC TIRE

[75] Inventors: Richard M. Menough; Robert W. Cuddigan, both of Denver, Colo.

[73] Assignee: The Gates Rubber Company, Denver, Colo.

[22] Filed: Apr. 12, 1973

[21] Appl. No.: 350,671

Related U.S. Application Data
[62] Division of Ser. No. 110,688, Jan. 28, 1971, Pat. No. 3,751,316.

[52] U.S. Cl............................................. 152/361 R
[51] Int. Cl............................................... B60c 9/18
[58] Field of Search.... 152/361 R, 361 FP, 361 DM

[56] References Cited
UNITED STATES PATENTS
2,493,614  1/1950  Bourdon ........................ 152/361 R
2,895,525  7/1959  Lugli ............................. 152/361 FP FOREIGN PATENTS OR APPLICATIONS
1,290,294  3/1962  France............................ 152/361 R

*Primary Examiner*—M. Henson Wood, Jr.
*Assistant Examiner*—George H. Libman
*Attorney, Agent, or Firm*—H. W. Oberg, Jr.; Raymond Fink; Curtis H. Castleman, Jr.

[57] ABSTRACT

A breaker band for tires having a plurality of plies of biased cut rubberized tire cord, the cords each bevel cut at the edge of the breaker band to define a breaker band that is substantially uniform trapezoidal cross-section.

4 Claims, 4 Drawing Figures

PATENTED SEP 24 1974 3,837,387

PATENTED SEP 24 1974 3,837,387

BREAKER BANDS FOR PNEUMATIC TIRE

This is a division of application Ser. No. 110,688 filed on Jan. 28, 1971, now U.S. Pat. No. 3,751,316 issued Aug. 7, 1973.

BACKGROUND OF THE INVENTION

The invention relates to pneumatic tires, but more particularly, the invention relates to a method of making breaker bands or strips for inclusion in pneumatic tires.

In known tire constructions, breaker bands are used between the outermost ply of the carcass and the tread portion of the tire. The breaker band reinforces and supports the tread portion while reducing tread wear and enhancing performance of the tire. Breaker bands of two or more plies are normally used as a tread reinforcement in both radial and bias ply tires.

Uniformity and alignment of the breaker band within the tire are important factors that affect operating characteristics of a tire. Should the breaker band be skewed with respect to the equatorial plane of the tire, the tire will have a tendency to wobble while rotating. Should the breaker band be of variable width or have somewhat scalloped edges, irregular wearing or flat-spotting at the edge of the tire results.

The breaker band may be eccentrically located in the tire because of irregular angles of the breaker band cords. The irregular angles cause uneven pantographing of the breaker band cords as the tire is formed during curing. When uneven pantographing occurs, the breaker band locates eccentrically in the tire. The eccentric breaker band then induces bad radial runout or a "thumping" of the tire as it is rotated. Overlapping the plies within the breaker band causes a variation in cord density. An irregular cord density induces flexure irregularity in the tire. The flexure irregularity may result in carcass separations or in a "rough" tire ride.

Prior art methods of making breaker bands characteristically cause the aforementioned irregularities to occur. Some prior art methods require the breaker band to be constructed concurrently during assembly of a green tire. Other methods assemble breaker bands on a flat green tire and then pantograph the reinforcement while shaping the tire into a torriod.

SUMMARY OF THE INVENTION

The invention is primarily directed toward manufacturing breaker bands which are uniform in construction and substantially free of irregularities. The breaker bands of the invention are made as a separate article of manufacture for later inclusion into an uncured or "green" pneumatic tire. The method of manufacturing the breaker bands include spiraling sheets of rubberized tire cord in successive layers and in a helical manner around a building drum. Successive layers of sheet material are spiraled as opposite helices. The plied layers of cord material define a sleeve which may be circumferentially cut into breaker bands of desired width. The breaker bands may be stored, shipped or immediately included into the manufacture process of a green pneumatic tire.

It is the object of the invention to provide a method of manufacturing breaker bands.

Another object of the invention is to provide a method of making a breaker band which is free of cord overlap.

Another object of the invention is to provide a method of making breaker bands which are substantially free of cord angle variations.

Yet another object of the invention is to provide a method of making breaker bands of uniform width.

Still another object of the invention is to balance the production time required to make a breaker band against the time required to assemble a tire carcass.

Another object of the invention is to provide a breaker band as a separate article of manufacture distinct of a tire.

Yet another object of the invention is to provide a belt of uniform diameter.

Another object of the invention is to provide a breaker band of uniform trapezoidal cross section.

Another object of the invention is to provide a pneumatic tire incorporating the breaker band of the invention.

These and other objects and advantages of the invention will become apparent upon review of the drawings and description thereof wherein.

DESCRIPTION OF PREFERRED EMBODIMENT

Breaker reinforcements are used between the outermost ply and tread of a tire carcass. The breaker reinforcement comprises plied sheets or layers of rubberized "cord" fabric or material that is formed into an endless band. Throughout this disclosure, the term "cord" includes cord, cable, wire or the like, as typically used as a reinforcement for tires. The cords are generally oriented symmetrically to form an angle with the equatorial plane of the breaker band. The angle is generally between 6° and 25° and is known as the breaker angle.

Figure 1:
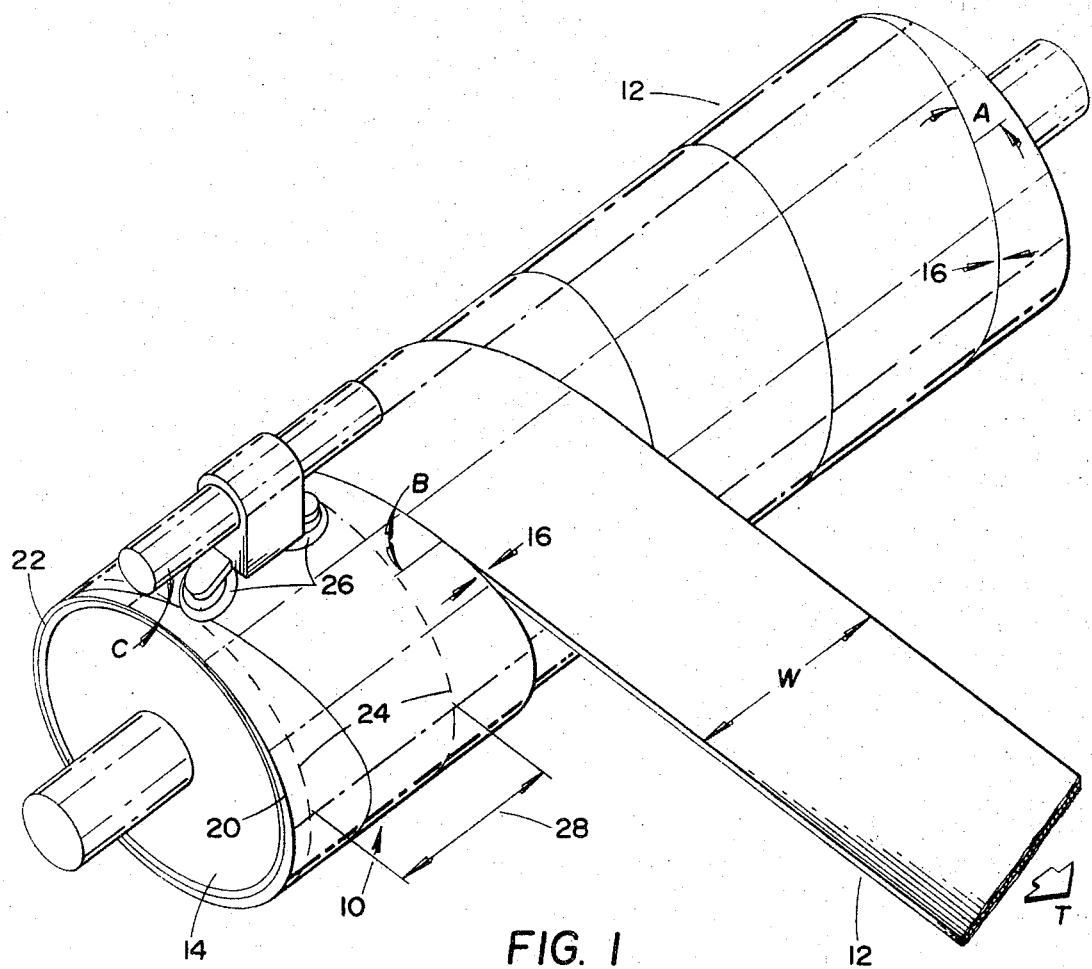
FIG. 1 shows sheets of rubberized tire cord fabric being spirally wrapped around a building to form a fabricated sleeve ready for cutting.

In accordance with the invention, a breaker band 10 is fabricated by spiraling successive sheets 12 of rubberized cord fabric helically around a building drum 14 of desired diameter as shown in FIG. 1. The diameter of the drum corresponds to the desired inside diameter of the uncured or "green" breaker band. Rubberized fabric is spiraled at a helical angle A which is complementary to the desired breaker angle. The cumulative width W of the rubberized fabric is chosen so the edges of the fabric are adjacent or touching 16 but not overlapping. Any number of strips may be used to achieve a desirable cumulative width W. A second layer of rubberized fabric 12 is then spiraled over the first fabric layer. Usually, it is desirous to spiral and ply successive layers at a opposite but equal helical angle B to achieve some type of structural balance within the breaker band. However, successive layers of rubberized fabric 12 may be plied to achieve any desired structure. When the sheets of rubberized fabric are plied around the drum, the cords of the fabric are slightly tensionsed T by pulling the fabric longitudinally. Since the application of force is longitudinal, there is no necking down or pantographing of the fabric. Consequently, the fabric cords remain generally equidistant from each other.

In prior art methods, rubberized fabric is plied by applying a force along the bias of the fabric. Application of a bias force may cause irregular necking down or pantographing when fabric cords are irregularly displaced.

The strips 12 of rubberized fabric cord may be advantageously pre-cut prior to the step of spiraling on the building drum. Pre-cutting facilitates repeatedly spiraling the fabric at a desired helical angle around the building drum 14 without the aid of special aligning equipment. For this reason, bias cutting strips of fabric is preferred. Refering to FIG. 2 a strip 18 of rubberized cord material or fabric is prepared by bias cutting. Fabric is bias cut at an angle C that is approximately equal to the desired breaker angle. The length L of the strip 18 corresponds generally to the helical length of the drum at the desired helical angle. The width W of the strip 18 is such that the length of the bias cut edge 20 equals the circumference of the building drum 14 or the cumulative diameter of the drum and the preceding ply. Several widths of narrow fabric may be adjacently arranged to achieve a desired width W although it is preferred to use just one width of fabric. The strip 18 of bias cut rubberized fabric is placed on the drum by aligning the cut edge 20 of the fabric with a circumferential edge or reference line of the drum 14. The fabric 18 is spiraled and plied as previously explained. By aligning the cut edge of the fabric with the drum, the resulting helical angle of the fabric A,B in realtion to the drum is accurately controlled. This is because the breaker angle C and the helical angle A,B are complementary. It should be noted here that when prior art rubberized fabric is bias cut into narrow bands, the uncut edges are overlapped and pressed together to form longer bands of bias fabric. Overlapping concentrates a few cords causing an irregularity. There are no such cord irregularities in fabric strips bias cut in accordance with the invention.

Uncured rubber materials are inherently cohesive. When successive strips of rubberized fabric cord are plied together by spiraling, the strips cohere forming a cylindrical sleeve 22 of plied material. Optionally, pressure may be applied to the sleeve as desired to enhance cohesion between the plies. Application of pressure to the sleeve is known in the rubber fabricating art as "stitching." After the cylindrical sleeve 22 of plied material has been fabricated, it is ready for cutting.

The sleeve 22 of plied material is circumferentially cut 24 with a cutter 26 to form breaker bands 10 of predetermined width 28. The building drum 14 or cutter 26 may be rotated in relation to each other. Preferably, the drum 14 is rotated. Any number of cutters 26 may be used and positioned at any desired angle in relation to the outside surface of the sleeve. It is preferred that at least a pair of cutters 26 be used and set a fixed distance apart. The pair of cutters balance the cutting forces transferred to the band 10 during the cutting process and thus eliminates any tendency to move the band. Also, dual cutters facilitate producing breaker bands of exacting widths 28.

Figure 3:
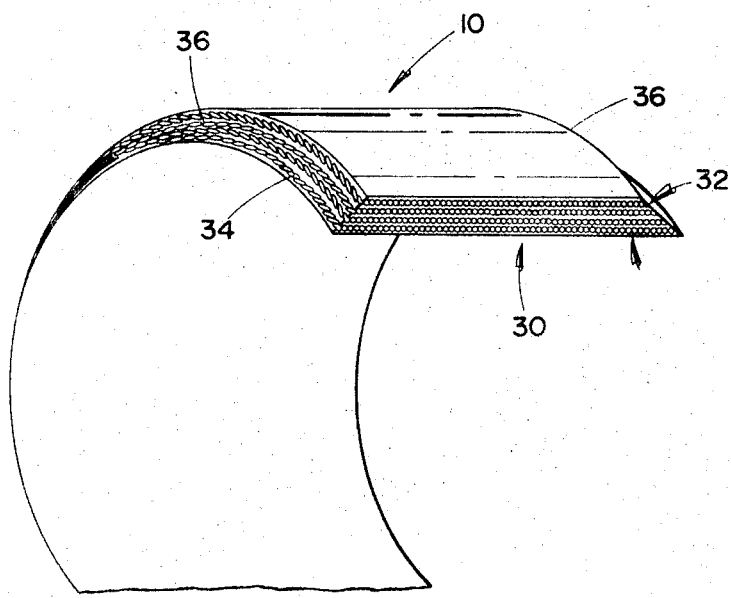
FIG. 3 is a partial sectional isometric view of a breaker band.

Refering to FIGS. 1 and 3, it has been found desirable to cut 24 the sleeve 22 into breaker bands 10 of substantially trapezoidal cross section 30, wherein the acute angles 32 of the trapezoid are preferably between 22° and 50°. In the cutting process, the cords of breaker band are bevel cut 34 to form the trapezoidal cross section 30. This gives the breaker band substantially uniform beveled edges, the benefit of which will be later explained. After the breaker bands 10 have been cut, they are removed from the drum. From this level in the manufacturing process, the breaker bands may be shipped to other facilities stored or directly included as part of a pneumatic tire. It is readily understood that the production rate of making breaker bands may be advantageously balanced against the production rate of fabricating the carcasses.

The above described method results in the production of breaker bands 10 that are substantially free of irregularities and have unique cut edges. The outside edges 36 of the breaker band 10 lie in pseudo-parallel planes. Because of this, the band 10 has a substantially constant and uniform trapezoidal cross section 30 throughout its circumference. The parallel edges 36 of the band provide a reference means for aligning the band accurately within an uncured or "green" tire.

When a breaker band 10 of the invention is to be included in a tire a green tire carcass is fabricated in a usual manner and expanded or formed into a toroidal shape. A breaker band is aligned with and united to the carcass. Next, a tread portion is applied over the breaker band and then the tire is molded and cured under heat and pressure. As part of the molding process, the cords of the breaker band are usually pantographed or "slipped" to a smaller breaker angle. The uniform breaker band construction assures uniform pantographing or slipping of the cords. The breaker angle change varies with the tire design. The change in breaker angle must be considered and included when establishing the helical angle for spiraling strips of rubberized fabric as previously discussed in relation to FIGS. 1 and 2.

Figure 2:
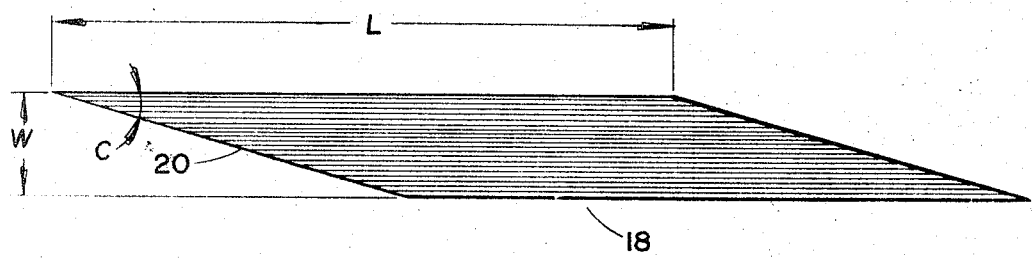
FIG. 2 is a view of a sheet of pre-cut rubberized tire cord.
Figure 4:
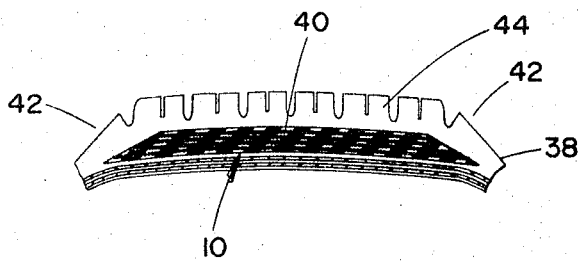
FIG. 4 is a cross sectional view of a pneumatic tire incorporating the breaker band of the invention.

Refering to FIGS. 2 and 4 breaker bands constructed in accordance with the invention, impart desirable characteristics to tires 38 in which they have been incorporated. The bevel cut cords 34 and pseudo-parallel edges 36 allow the outermost plies 40 of the breaker band to be extended to near the circumferential edge 42 of the tire. The extension of the outermost plies provides greater area of support for the tread portion 44. This has the effect of eliminating irregular tread edge wear. Also, the bevel cut breaker band cords 34 provide a somewhat linear or smooth transition section between the edge of the tire tread and the breaker band. The smooth transition section promotes "even" wearing of the tread edge apparently because of the continuity of support which is provided.

The foregoing detailed description was made for purpose of illustration only and is not intended to limit the scope of the invention which is to be determined from the appended claims.

What is claimed is:

1. A breaker band for tires comprising:
a plurality of plies of biased rubberized tire cord fabric arranged to form an endless band having substantially parallel edges, the cords of a ply arranged at a desired angle from the equatorial plane of the band, and the band concurrently bevel cut circumferentially at desired facing angles at the edges to define a breaker band of substantially uniform trapezoidal cross-section with the cords bevel cut in equatorial and radial planes of the band where the radially inner band width is greater than the radially outer band width, and the bevel cuts of the cords form facing angles with the equatorial plane of the band.

2. A breaker band as set forth in claim 1 wherein the cords are bevel cut at angle from 22° to 50°.

3. In a tire having casing cords and a continuous peripheral tread, the improvement which comprises providing between the casing cords and tread a breaker band reinforcement which includes:

a plurality of plies of biased rubberized tire cord fabric arranged to form an endless band having substantially parallel edges, the cords of a ply arranged at a desired angle from the equatorial plane of the band, and the band concurrently bevel cut circumferentially at desired facing angles at the edges to define a breaker band of substantially uniform trapezoidal cross-section with the cords bevel cut in relation to equatorial and radial planes of the band where the radially inner band width is greater than the radially outer band width and the bevel cuts of the cords form facing angles with the equatorial plane of the band.

4. A tire as set forth in claim 3 wherein the cords of the breaker band are beveled cut and at angles from 22° to 50°.

* * * * *